US00RE45522E

(19) United States
(12) Reissued Patent
Han et al.

(10) Patent Number: US RE45,522 E
(45) Date of Reissued Patent: May 19, 2015

(54) METHOD AND APPARATUS FOR GENERATING AND TRANSMITTING CODE SEQUENCE IN A WIRELESS COMMUNICATION SYSTEM

(71) Applicant: EVOLVED WIRELESS LLC, Austin, TX (US)

(72) Inventors: Seung Hee Han, Seoul (KR); Min Seok Noh, Seoul (KR); Yeon Hyeon Kwon, Suwon-si (KR); Hyun Hwa Park, Anyang-si (KR); Hyun Woo Lee, Anyang-si (KR); Dong Cheol Kim, Uiwang-si (KR)

(73) Assignee: EVOLVED WIRELESS LLC, Austin, TX (US)

(21) Appl. No.: 14/051,074

(22) Filed: Oct. 10, 2013

Related U.S. Patent Documents

Reissue of:
(64) Patent No.: 8,036,256
Issued: Oct. 11, 2011
Appl. No.: 12/777,975
Filed: May 11, 2010

U.S. Applications:
(63) Continuation of application No. 11/563,909, filed on Nov. 28, 2006, now Pat. No. 7,746,916.

(30) Foreign Application Priority Data

| | | |
|---|---|---|
| Nov. 28, 2005 | (KR) | 10-2005-0114306 |
| Jul. 4, 2006 | (KR) | 10-2006-0062467 |
| Jul. 7, 2006 | (KR) | 10-2006-0064091 |

(51) Int. Cl.
*H04L 27/30* (2006.01)
*H04L 12/24* (2006.01)

(52) U.S. Cl.
CPC ..... *H04L 41/028* (2013.01)

(58) Field of Classification Search
USPC ..... 375/145, 146, 149, 354, 364, 365, 367, 375/368; 370/500, 503, 509, 510, 512, 514, 370/515; 708/250, 252, 255, 274, 275
See application file for complete search history.

(56) References Cited

U.S. PATENT DOCUMENTS

| | | | |
|---|---|---|---|
| 4,621,173 | A | 11/1986 | Guidoux |
| 5,363,144 | A | 11/1994 | Park |

(Continued)

FOREIGN PATENT DOCUMENTS

| | | |
|---|---|---|
| CN | 1674467 | 9/2005 |
| EP | 1065855 | 1/2001 |

(Continued)

OTHER PUBLICATIONS

Taiwan Intellectual Property Office Application Serial No. 095144311, Office Action dated May 16, 2012, 5 pages.

(Continued)

*Primary Examiner* — Dac Ha
(74) *Attorney, Agent, or Firm* — Jason H. Vick; Sheridan Ross, PC

(57) ABSTRACT

A method of generating a code sequence in a wireless communication system is disclosed. More specifically, the method includes recognizing a desired length of the code sequence, generating a code sequence having a length different from the desired length, and modifying the length of the generated code sequence to equal the desired length. Here, the step of modifying includes discarding at least one element of the generated code sequence or inserting at least one null element to the generated code sequence.

3 Claims, 18 Drawing Sheets

(56) References Cited

U.S. PATENT DOCUMENTS

| | | | | |
|---|---|---|---|---|
| 5,479,444 | A | 12/1995 | Malkamaki et al. | |
| 6,175,559 | B1 | 1/2001 | Brown | |
| 6,667,708 | B2 | 12/2003 | Schooler et al. | |
| 6,731,673 | B1 * | 5/2004 | Kotov et al. | 375/145 |
| 7,027,444 | B2 | 4/2006 | Kim et al. | |
| 7,426,175 | B2 | 9/2008 | Zhuang et al. | |
| 7,746,916 | B2 | 6/2010 | Han et al. | |
| 2003/0043887 | A1 | 3/2003 | Hudson | |
| 2003/0156624 | A1 | 8/2003 | Koslar | |
| 2004/0032917 | A1 | 2/2004 | Hwang et al. | |
| 2004/0170157 | A1 * | 9/2004 | Kim et al. | 370/349 |
| 2005/0036481 | A1 | 2/2005 | Chayat et al. | |
| 2005/0047325 | A1 | 3/2005 | Singh et al. | |
| 2005/0226140 | A1 | 10/2005 | Zhuang et al. | |
| 2005/0226142 | A1 | 10/2005 | Moorti et al. | |
| 2006/0050799 | A1 * | 3/2006 | Hou et al. | 375/260 |
| 2009/0252260 | A1 * | 10/2009 | Noh et al. | 375/343 |
| 2010/0220695 | A1 | 9/2010 | Han et al. | |

FOREIGN PATENT DOCUMENTS

| | | |
|---|---|---|
| EP | 1473838 | 11/2004 |
| JP | 2000354021 | 12/2000 |
| JP | 2001308823 | 11/2001 |
| JP | 2002077105 | 3/2002 |
| JP | 2003318704 | 11/2003 |
| JP | 2008511253 | 4/2008 |
| JP | 4463458 | 5/2010 |
| KR | 10-2007-0103917 | 10/2007 |
| RU | 2242819 | 12/2004 |
| RU | 2258306 | 8/2005 |
| TW | 576034 | 2/2004 |
| TW | I222790 | 10/2004 |
| WO | 9605668 | 2/1996 |
| WO | WO 01/13531 | 2/2001 |
| WO | WO 02/101962 | 12/2002 |
| WO | 03-049295 | 6/2003 |
| WO | 03-075500 | 9/2003 |
| WO | 2005-104412 | 11/2005 |
| WO | WO 2006/023423 | 3/2006 |

OTHER PUBLICATIONS

Intellectual Property Office of India Application Serial No. 1896/KOLNP/2008, Office Action dated Oct. 8, 2013, 2 pages.

Texas Instruments, "On Allocation of Uplink Pilot Sub-Channels in EUTRA SC-FDMA," 3GPP TSG RAN WG1 Ad Hoc on LTE, R1-050822, Aug. 2005, XP-003023002.

Chu, David C. "Polyphase Codes with Good Periodic Correlation Properties" Inforamtion Theory IEEE Transaction on, vol. 18, Issue 4, pp. 531-532, Jul. 1972).

Notification of Reason for Refusal for Korean Application No. 10-2005-0114306, issued Jun. 13, 2012.

Decision to Grant Application for Korean Application No. 10-2005-0114306, issued Nov. 2, 2012.

Notification of Reason for Refusal for Korean Application No. 10-2006-0062467, issued Aug. 11, 2009.

Decision of Refusal for Korean Application No. 10-2006-0062467, issued Sep. 29, 2009.

Decision to Grant for Korean Application No. 10-2006-0062467, issued Nov. 19, 2009.

Decision of Refusal for Korean Application No. 10-2006-0064091, issued Aug. 6, 2012.

Decision to Grant for Korean Application No. 10-2006-0064091, issued Feb. 14, 2013.

International Search Report for International Application No. PCT/KR2006/005060, mailed Jun. 26, 2008.

Written Opinion for International Application No. PCT/KR2006/005060, mailed Jun. 26, 2008.

International Preliminary Report on Patentability for International Application No. PCT/KR2006/005060, mailed Jul. 31, 2008.

First Notification of Office Action (including translation) for Chinese Patent Application No. 200680044410.X, issued Dec. 31, 2010.

Second Notification of Office Action (including translation) for Chinese Patent Application No. 200680044410.X, issued Aug. 2, 2011.

Notice of Allowance (including translation) for Chinese Patent Application No. 200680044410.X, issued Feb. 1, 2012.

European Search Report for European Application No. 06823768.4, mailed Jun. 6, 2011.

Communication Pursuant to Rules 70(2) and 70a(2) EPC for European Application No. 06823768.4, mailed Jun. 24, 2011.

Official Action for European Application No. 06823768.4, mailed Jul. 12, 2012.

Official Action for Indian Patent Application No. 1896/KOLNP/2008, mailed Oct. 8 2013.

First Office Action for Japanese Application No. 2008-542252, mailed Apr. 27, 2011.

Notice of Allowance for Japanese Application No. 2008-542252, mailed Aug. 4, 2011.

Office Action for Mexican Patent Application No. MX/a/2008/005905, mailed May 14, 2010.

Notice of Allowance for Mexican Patent Application No. MX/a/2008/005905, mailed Jul. 23, 2010.

Office Action (including translation) for Russian Patent Application No. 2008126206, mailed Oct. 11, 2009.

Notice of Allowance (including translation) for Russian Patent Application No. 2008126206, mailed Dec. 10, 2009.

Decision of Patent Examination (including translation) for Taiwan Application No. 095144311, issued Aug. 31, 2012.

Office Action for U.S. Appl. No. 11/563,909, mailed Jun. 26, 2009.

Notice of Allowance for U.S. Appl. No. 11/563,909, mailed Mar. 19, 2010.

Notice of Allowance for U.S. Appl. No. 12/777,975, mailed Jan. 26, 2011.

Notice of Allowance for U.S. Appl. No. 12/777,975, mailed Jul. 20, 2011.

Hearing Notice for Indian Patent Application No. 1896/KOLNP/2008, mailed Dec. 11, 2014.

Texas Instruments, "On Allocation of Uplink Pilot Sub-Channels in EUTRA SC-FDMA," 3GPP TSG RAN WG1 Ad Hoc on LTE, R1-050822, Aug. 2005.

Dubey et al., "Extended Orthogonal Polyphase Codes for Multicarrier CDMA System," IEEE Communications Letters, vol. 8, No. 12, Dec. 2004, XP-011123455.

* cited by examiner

METHOD AND APPARATUS FOR GENERATING AND TRANSMITTING CODE SEQUENCE IN A WIRELESS COMMUNICATION SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

This application *is a reissue of U.S. Pat. No. 8,036,256, which issued on Oct. 11, 2011, from U.S. application Ser. No. 12/777,975, filed on May 11, 2010, which* is a continuation of U.S. application Ser. No. 11/563,909, filed Nov. 28, 2006, now U.S. Pat. No. 7,746,916, which claims the benefit of Korean Application No. P2005-114306, filed on Nov. 28, 2005, Korean Application No. P2006-62467, filed on Jul. 4, 2006, and Korean Application No. P2006-64091, filed on Jul. 7, 2006, which are all hereby incorporated by reference herein in their entirety.

BACKGROUND OF THE INVENTION

1. Field of the Invention

The present invention relates to a method of generating and transmitting code sequence, and more particularly, to a method and apparatus for generating and transmitting code sequence in a wireless communication system.

2. Discussion of the Related Art

Usually, a pilot signal or a preamble of a wireless communication system is referred to as a reference signal used for initial synchronization, cell search, and channel estimation. Further, the preamble is comprised of a code sequence, and the code sequence is further comprised of orthogonal or quasi-orthogonal which represent good correlation properties.

For example, a Hadamard matrix of 128×128 is used in a portable internet (PI) to insert the code sequence to the frequency domain. In so doing, 127 types of code sequences are used.

Although the Hadmard code sequence and a poly-phase Constant Amplitude Zero Auto-Correlation (CAZAC) code sequence are orthogonal codes, a number of codes used to maintain orthogonality is limited. For example, a number of N orthogonal codes in a N×N Hadamard matrix is N, and a number of N orthogonal codes that can be expressed by the CAZAC codes is N and a prime number smaller than N (David C. Chu, "Polyphase Codes with Good Periodic Correlation Properties," Information Theory IEEE Transaction on, vol. 18, issue 4, pp. 531-532, July 1972). With respect to CAZAC sequence types, GCL CAZAC and Zadoff-Chu CAZAC are often used.

If the code sequence is generated using the Hadamard codes, N number of sequence types corresponding to the entire length of the codes is generated. However, the if the code sequence is generated using the CAZAC codes, only half or N/2 number of sequence types are generated.

SUMMARY OF THE INVENTION

Accordingly, the present invention is directed to a method and apparatus for generating and transmitting code sequence in a wireless communication system that substantially obviates one or more problems due to limitations and disadvantages of the related art.

An object of the present invention is to provide a method of generating a code sequence in a wireless communication system.

Another object of the present invention is to provide an apparatus for generating a code sequence in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of generating a code sequence in a wireless communication system includes recognizing a desired length of the code sequence, generating a code sequence having a length different from the desired length, and modifying the length of the generated code sequence to equal the desired length. Here, the step of modifying includes discarding at least one element of the generated code sequence or inserting at least one null element to the generated code sequence.

In another aspect of the present invention, method of generating a code sequence in a wireless communication system includes a recognizing a desired length of a first code sequence, generating a second code sequence having a length different from the desired length of the first code sequence, and modifying the length of the second code sequence to equal the desired length of the first code sequence. Here, the step of modifying includes discarding at least one element of the modified code sequence if the length of the modified code sequence is longer than the desired length of the first code sequence or inserting at least one null element to the modified code sequence if the length of the modified second code sequence is shorter than the desired length of the first code sequence.

In a further aspect of the present invention, an apparatus for generating a code sequence in a wireless communication system includes a sequence selection unit for recognizing a desired length of the code sequence, generating a code sequence having a length different from the desired length, and modifying the length of the generated code sequence to equal the desired length, wherein the sequence selection unit discards at least one element of the generated code sequence or inserts at least one null element to the generated code sequence in modifying the length of the generated code sequence, and a transmitting unit for transmitting the modified generated code sequence via at least one antenna.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
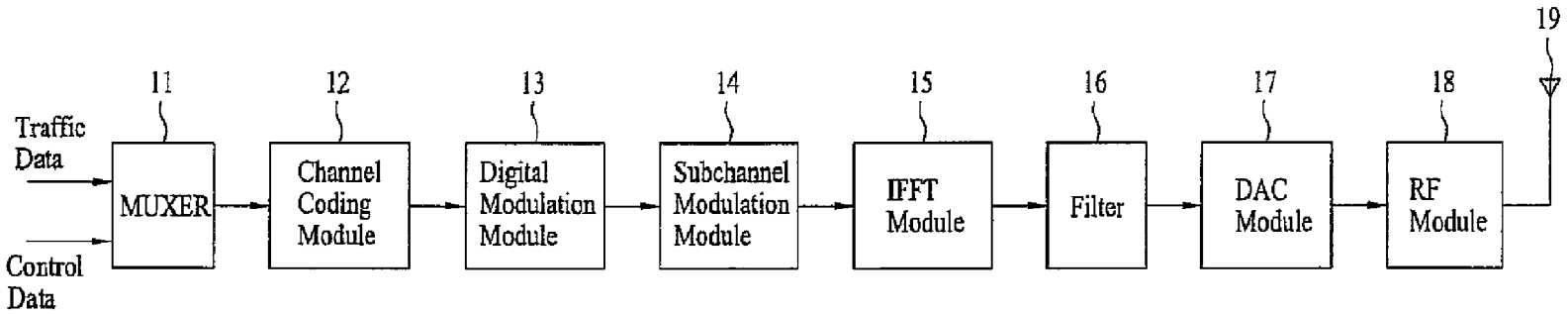
FIG. 1 illustrates a structure of an apparatus for transmitting data using Orthogonal Frequency Division Multiplexing (OFDM) or OFDM Access (OFDMA) scheme.
Figure 2:
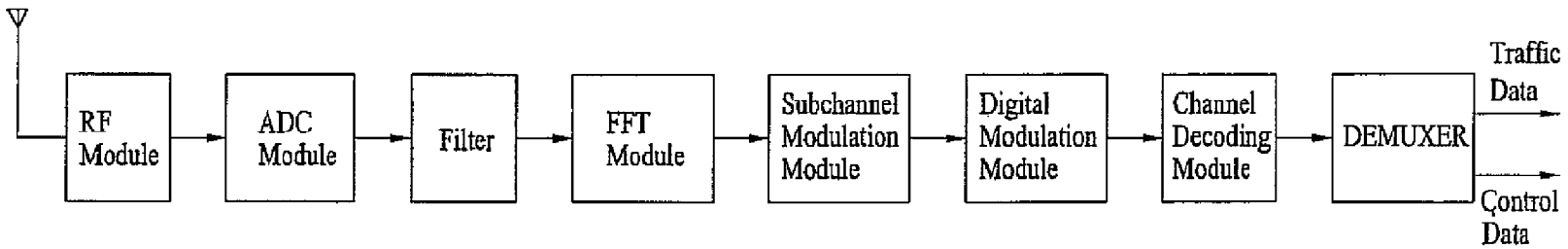
FIG. 2 illustrates a structure of an apparatus for receiving data using OFDM/OFDMA scheme.

FIG. 1 illustrates a structure of an apparatus for transmitting data using Orthogonal Frequency Division Multiplexing (OFDM) or OFDM Access (OFDMA) scheme. FIG. 2 illustrates a structure of an apparatus for receiving data using OFDM/OFDMA scheme.

In FIG. 1, traffic data and control data are multiplexed at a muxer 11. Here, the traffic data is used to provide service from a transmitting end to a receiving end, and the control data is used to facilitate transmission from the transmitting end to the receiving end. The discussion relating to the present invention regarding the code sequence which relates to a type of a code sequence of the control data. The code sequence can be used for initial synchronization, cell search, or channel estimation.

Depending on the communication system, the code sequence can be used in various forms. For example, the code sequence in an IEEE 802.16 wideband wireless access system can be used in a preamble or a pilot signal format, and in a multi-input, multi-output (MIMO) system, the code sequence can be used as a midamble format.

After being processed at the muxer 11, the multiplexed traffic and control data is then channel coded by a channel coding module 12. Channel coding is used to allow the receiving end to correct error that can occur during transmission by adding parity bits. Examples of channel coding include convolution coding, turbo coding, and low density parity check (LDPC) coding.

Thereafter, the channel coded data is modulated by a digital modulation module 13 in which data symbols are mapped using algorithms such as a quadrature phase shift keying (QPSK) or a 16-quadrature amplitude modulation (16QAM). The mapped data symbols are then processed by a subchannel modulation module 14 through which the data symbols are mapped to each subcarrier of the OFDM system or OFDMA system. Then, the data symbols mapped to subcarriers are processed by an inverse fast Fourier transform (IFFT) module 15 which transform the data symbols into a signal in a time domain. The transformed data symbols are then processed through a filter 16 and further processed through a digital-to-analog conversion (DAC) module 17 where the filtered data symbols are converted to analog signals. Lastly, the analog signals are converted into a radio frequency (RF) by a RF module 18 which is then transmitted via an antenna 19 to the receiving end.

Based on the type of generated code (e.g., CAZAC code), the steps of channel coding and/or symbol mapping can be omitted. FIG. 2 illustrates a receiving end whose processes are inverse to those of the transmitting end.

A code sequence is used for transmitting control information, which includes identification (ID) and synchronization information, to classify types of sequences in a communication system. In order for more effective reception of the control information using code sequence, the code sequence can be adjusted or modified. Further, the code sequence can be applied to all of the channels that use code sequence for control signaling such as a random access channel (RACH), downlink/uplink reference symbol, channel quality information (CQI), and Acknowledgement (ACK)/Negative Acknowledgement (NACK).

Figure 3:
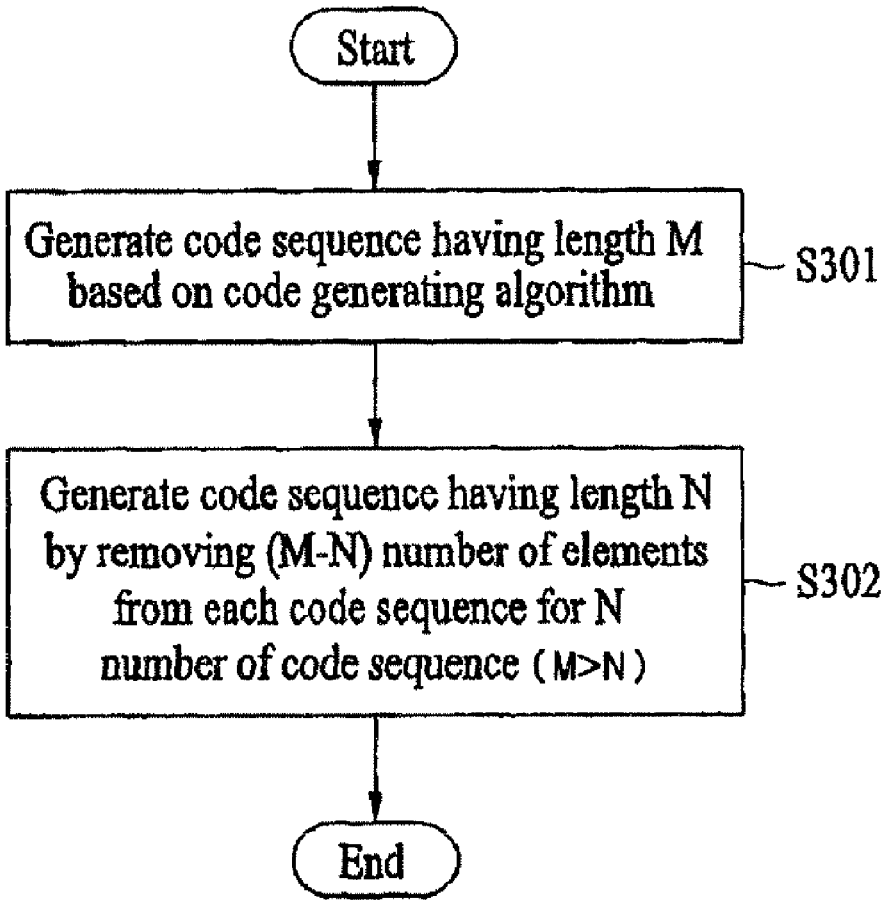
FIG. 3 is a flow diagram illustrating adjusting a code sequence.

FIG. 3 is a flow diagram illustrating adjusting a code sequence. More specifically, a length of the code sequence is defined as N, a number of codes in the code sequence is defined as ${}^{N}{}_{seq_N}$, and a code sequence set defined as ${}^{a}N_{seq_N}$xN. In operation, the code sequence set ${}^{a}N_{seq_N}$xN having ${}^{N}{}_{seq_N}$ number of codes can be extended to a code sequence set ${}^{a}N_{seq_N}$xN having ${}^{N}{}_{seq_M}$ number of codes.

Equation ${}^{a}N_{seq_N}xN$ is a matrix of ${}^{N}{}_{seq_N}{}^{x}N$ of $$a_{N_{seq_N}xN} = \left[a^{0}_{N_{seq_N}xN} a^{1}_{N_{seq_N}xN} \ldots a^{N_{seq}-1}_{N_{seq_N}xN}\right]^{T}, \text{ and } a^{k}_{N_{seq_N}xN}$$

is a row vector of $$a^{k}_{N_{seq_N}xN} = \left[a^{k}_{N_{seq_N}xN}(0) a^{k}_{N_{seq_N}xN}(1) \ldots a^{k}_{N_{seq_N}xN}(N-1)\right].$$

Furthermore, $$a^{k}_{N_{seq_N}xN}(n)$$

(n) indicates n(=0,1,2, . . . , element of k(=0,1,2, . . . , $N_{seq_N}-1$) code sequence.

Referring to FIG. 3, a code sequence set ${}^{a}N_{seq_N}xM$, having ${}^{N}{}_{seq_M}$ number of code sequence(s) where each code sequence has length M, can be generated based on the code generation algorithm based on code type in which a value of length M is a natural number greater than a value of length N (S301). Here, the code types include Hadamard code, Pseudo Noise (PN) code, and a Constant Amplitude Zero Auto-Correlation (CAZAC) code, among others to be used for initial synchronization, cell search, and channel estimation in the wireless communication system. The code sequence set having length M per each code type can be generated by various schemes as discussed. As for the CAZAC code, the value of length M is a smallest prime number greater than the value of length N, preferably.

Subsequently, a code sequence set ${}^{a}N_{seq_N}xN$ having ${}^{N}{}_{seq_M}$ number of code sequences, can be generated where a resulting length of the code sequence is length N. More specifically, the code sequence set ${}^{a}N_{seq_N}xM$ having ${}^{N}{}_{seq_M}$ number of code sequences where each code sequence has length M (from step S301), can have elements of the code sequence removed. That is, elements which comprise each code sequence can be removed from the code sequence allowing the length of the code sequence to be adjusted or shortened. Here, M−N number of elements can be removed from the code sequence whose length corresponds to length M. By removing elements from the code sequence with length M, a code sequence having length N can be generated. As discussed, N is smaller than M.

Consequently, a code sequence set ${}^{a}N_{seq_N}xN$ having ${}^{N}{}_{seq_M}$ number of code sequences in which each code sequence has length N, can be generated (S302).

A code sequence is used for transmitting control information, which includes identification (ID) and synchronization information, to classify types of sequences in a communication system. Currently in 3$^{rd}$ Generation Partnership Project (3GPP) Long Term Evolution (LTE), a CAZAC sequence is being considered.

The CAZAC sequence can be used by channels to output various IDs and information. The channels include channels for downlink synchronization (e.g., primary synchronization channel, secondary synchronization channel, and broadcast channel), uplink synchronization (e.g., random access channel), and pilot channels (e.g., data pilot and channel quality pilot). Further, the CAZAC sequence can be used in scrambling as well as channels that use code sequence such as RACH.

Although there are various types of the CAZAC sequences, there are two types of often used CAZAC sequences—GCL CAZAC and Zadoff-Chu CAZAC. The Zadoff-Chu CAZAC sequence can be defined by the following equations.

$$c(k; N, M) = \exp\left(\frac{j\pi Mk(k+1)}{N}\right) \text{ (for odd N)} \quad \text{[Equation 1]}$$

$$c(k; N, M) = \exp\left(\frac{j\pi Mk^{2}}{N}\right) \text{ (for even N)} \quad \text{[Equation 2]}$$

Here, k denotes sequence index, N denotes a length of CAZAC to be generated, and M denotes sequence ID.

If the Zadoff-Chu CAZAC sequence and the GCL CAZAC sequence are expressed by c(k; N, M) as shown in Equations 1 and 2, then the sequences have the following three (3) characteristics as presented in following equations.

$$|c(k; N, M)| = 1 \text{(for all k, N, M)} \quad \text{[Equation 3]}$$

$$R_{M:N}(d) = \begin{cases} 1, \text{ (for } d = 0) \\ 0, \text{ (for } d \neq 0) \end{cases} \quad \text{[Equation 4]}$$

$$R_{M_1,M_2;N}(d) = p \text{ (for all } M_1, M_2 \text{ and N)} \quad \text{[Equation 5]}$$

According to Equation 3, the CAZAC sequence always has a size of 1, and the CAZAC sequence of Equation 4 has an auto-correlation function denoted by a delta function. Here, the auto-correlation is based on circular correlation. Further, Equation 5 is a cross-correlation which is constant if N is a prime number.

If the length to be applied in the wireless communication system for generating the CAZAC sequence is denoted by L, a method for generating the CAZAC sequence sets N of Equations 1 and 2 to equal L (N=L)—identified as step (1). Step (2) can be identified by a method where a value of N is set to be a prime number greater than a value of length L for generating the CAZAC sequence.

Referring to the characteristics of the generated CAZAC sequence having a specified length of L, if L is not a prime number, the generated CAZAC sequence can include M=1, 2, . . . L−1 number of codes, some of which are repeated codes. In other words, the number of different codes is less than L−1 number of codes. On the contrary, if L is a prime number, there is L−1 number of different codes. The above descriptions may also be applied to other types of code sequences and are not limited to Zadoff-Chu CAZAC sequence.

Further, the following technique has been considered. More specifically, if the length of code to be applied to the system is not a prime number, and there are a large number of codes to be used, a smallest prime number greater than L was selected. Using the selected prime number, the CAZAC sequence was generated, and discards or removes at least one element of the generated CAZAC sequence for use. This technique is different than the technique introduced with respect to step 1.

For example, assume that a number of codes of a CAZAC code sequence (N) is 1024. The following equation can be used to express an algorithm for generating a Zadoff-Chu CAZAC code.

$$a^{index(A)}(n) = \begin{cases} \exp\left(i\frac{A\pi n(n+1)}{M}\right), \text{ when M is odd} \\ \exp\left(i\frac{A\pi n^2}{M}\right), \text{ when M is even} \end{cases} \quad \text{[Equation 6]}$$

where n = 0, 1, 2, … , M − 1

In Equation 6, A and M are natural numbers, and index (A)(=0,1,2, . . . , $N_{seq_M}$−1) is an index of A in ascending order. In order to extend the CAZAC sequence where N=1024, a smallest prime number greater than 1024 is used. That is, the smallest prime number greater than 1024 is 1031. As such, the code sequence set ${}^{a}N_{seq_N}$xM where M=1031 is applied to Equation 6.

Since M (=1031) is a prime number, ${}^{N}{}_{seq_M}$=1030. Furthermore, A can be referred to as a seed value used to generate a code sequence maintaining CAZAC properties. If M is a prime number, a total of M−1 number of code sequences can be generated. In other words, for example, if M=1024, a total of 512 (=1024/2 or N/2) number of code sequences are generated. However, if M=1031, a total of 1030 number of code sequences (M−1) are generated. Moreover, the cross-correlation properties of the generated code sequence are better if M is a prime number than a composite number.

In order to adjust or modify the CAZAC code sequence set ${}^{a}N_{seq_N}$xM where M=1031 to a code sequence set ${}^{a}N_{seq_N}$xM whose length is N=1024, M−N number of elements can be removed from index n=N, . . . , M−1, generating a code sequence set ${}^{a}N_{seq_N}$xN.

In determining the value of M, although the number of code sequences can increase with increase in value of N, it is preferable to determine the value of M based on the code sequence whose length is N that promotes maintenance of good correlation properties. In case of the CAZAC code, optimum correlation properties can be attained if the value of length M is the smallest prime number greater than the value of length N.

If the code sequence set ${}^{a}N_{seq_N}$xN generated using length N=1024 is compared with the code sequence set ${}^{a}N_{seq_N}$xN, a total number code sequences of the former can be represented by N/2 or 512 (=1024/2) code sequences having an index 0,1,2, . . . , N/2−1 (N=1024), and a total number of code sequences of the latter can be represented by M−1 or 1030 having an index 0,1,2, . . . , M−2 (M=1031).

Figure 4:
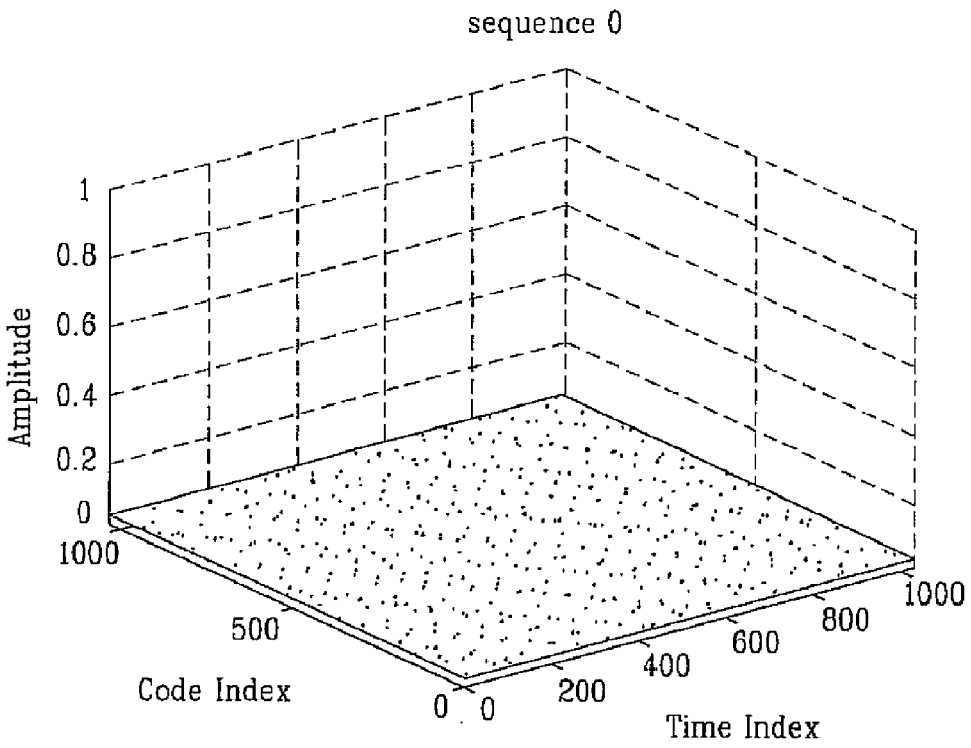
FIG. 4 illustrates cross-correlation properties of the generated code sequence.

FIG. 4 illustrates cross-correlation properties of the generated code sequence. More specifically, the cross-correlation properties of ${}^{a_k}N_{swq_M}$xN (k=1,2, . . . , $N_{seq_M}$−1) associated with the remaining ${}^{N}{}_{seq_M}$ (1029) code sequences for ${}^{a_0}N_{seq_M}$xN code sequence of the code sequence set ${}^{a}N_{seq_N}$xN. The figure illustrates this with respect to amplitude, code index, and time index.

Figure 5:
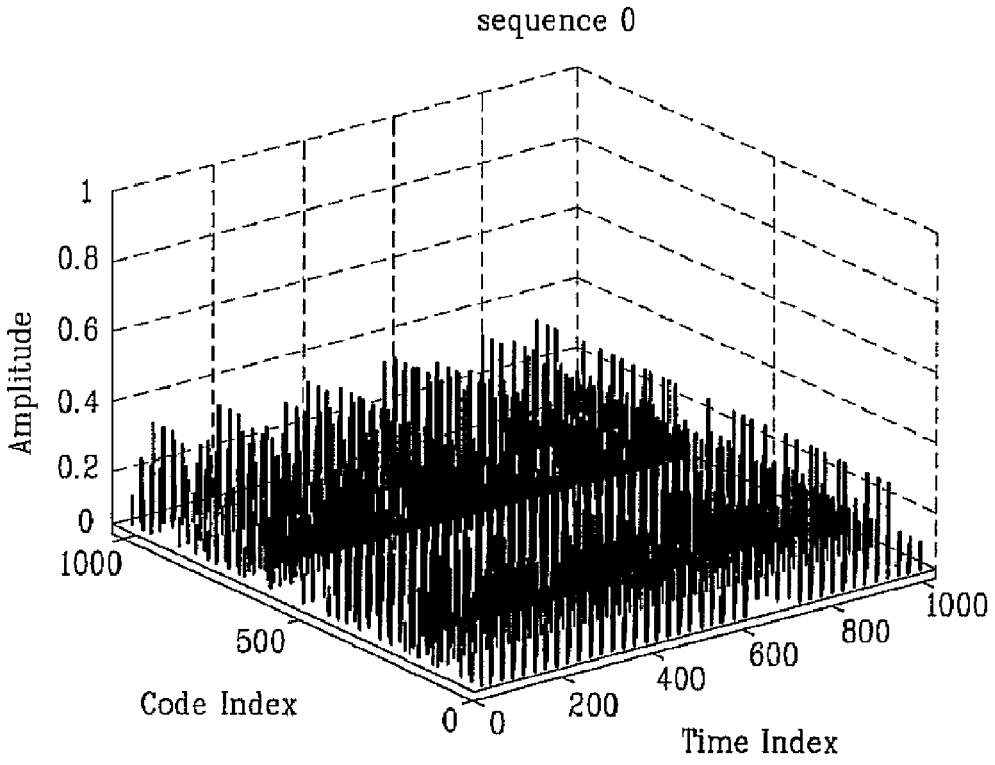
FIG. 5 illustrates a generated CAZAC sequence ${}^{a}N_{seq_N}$xN using N (=1024)

Further, FIG. 5 illustrates a generated CAZAC sequence ${}^{a}N_{seq_N}$xN using N (=1024). More specifically, the figures illustrate cross-correlation properties of ${}^{a_k}N_{swq_M}$xN (k=1, 2, . . . , $N_{seq_M}$−1) regarding the remaining ${}^{N}{}_{seq_N}$ (511) code sequences. The figure illustrates this with respect to amplitude, code index, and time index. Between FIG. 4 and FIG. 5, the cross-correlation properties of the generated code sequence of FIG. 4 are better.

Figure 6:
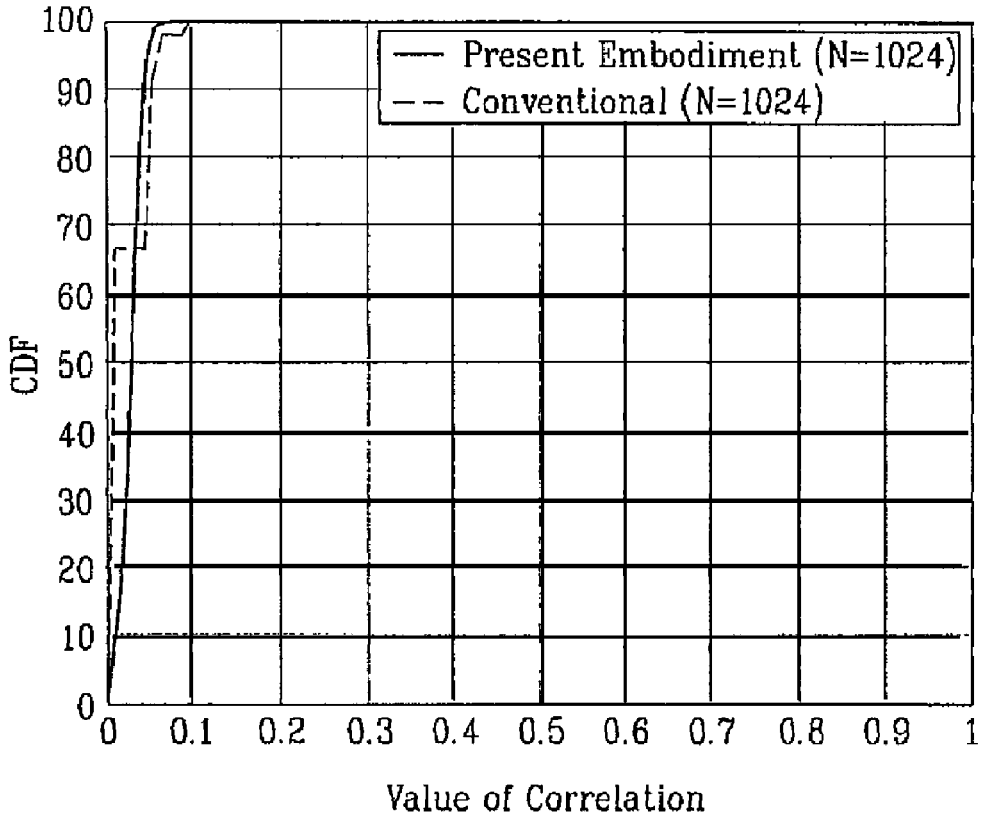
FIG. 6 illustrates a cross-correlation properties cumulative distribution function (CDF) of the code sequences that can be generated according to the code sequence ${}^{a}N_{seq_N}$xN and the CAZAC sequence ${}^{a}N_{seq_N}$xN when N=1024.

FIG. 6 illustrates a cross-correlation properties cumulative distribution function (CDF) of the code sequences that can be generated according to the code sequence ${}^{a}N_{seq_N}$xN and the CAZAC sequence ${}^{a}N_{seq_N}$xN when N=1024.

Figure 7:
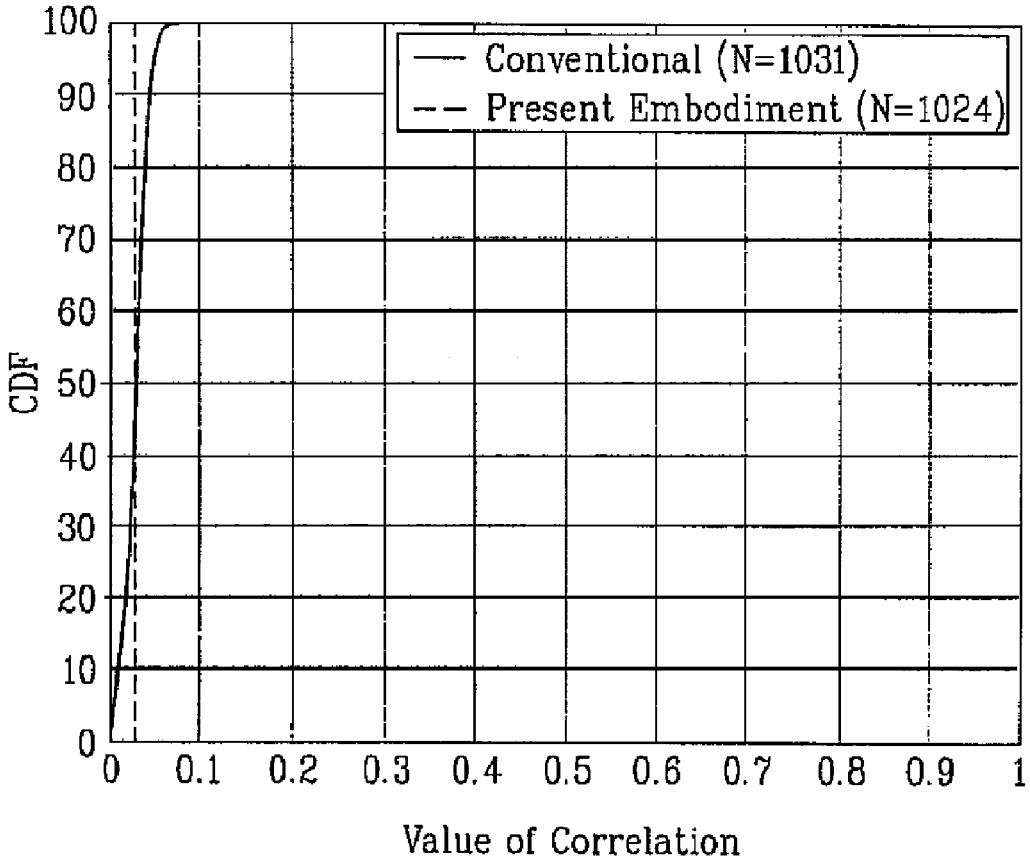
FIG. 7 illustrates the cross-correlation properties CDF of the code sequences that can be generated based on the CAZAC sequence generated using the prime number of N=1031 and a code sequence set ${}^{a}N_{seq_N}$xN having length of 1024 (seven (7) elements removed)

FIG. 7 illustrates the cross-correlation properties CDF of the code sequences that can be generated based on the CAZAC sequence generated using the prime number of N=1031 and a code sequence set ${}^{a}N_{seq_N}$xN having length of 1024 (seven (7) elements removed). The performance lines of FIGS. 4-7 indicate that the code sequence set with seven (7) elements removed has equivalent cross-correlation properties compared to the original code sequence set.

As discussed, the codes in addition to the CAZAC code are available, such as the PN code and the Hadamard code. The discussion with respect to the CAZAC code sequence can also be applied to the PN code and the Hadamard code. With respect to the PN code, a modular shift register generator is used to generate the code sequences. If a number of shift registers generated is represented by N, a code sequence having a length of $2^N$−1 is generated. Thereafter, a value "1" is added to the shift register, resulting in a length $2^{N+1}$−1, and then, adjust the length to equal $2^N$.

With respect to the Hadamard codes, a number of code sequences, which equal the length of the code sequence, make up a code sequence. However, for example, if M number of code sequences having length N is required (M>N), then M number of code sequences having length M are generated, followed by removing a specified number of elements to make the length of the code sequence equal length N.

Figure 8:
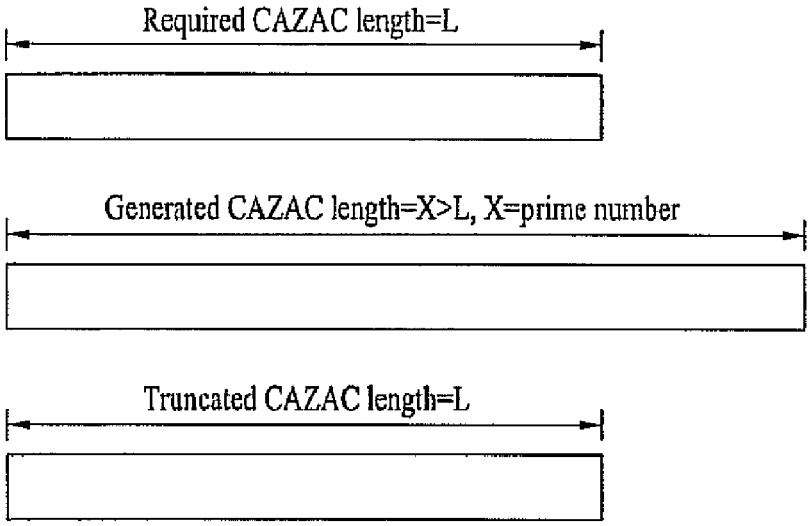
FIG. 8 illustrates a method of generating CAZAC sequence using a length required by a communication system.

FIG. 8 illustrates a method of generating CAZAC sequence using a length required by a communication system. That is, the required (or desired) length of the CAZAC sequence can be represented by length L. Further, the codes types can be extended. However, since a generated code sequence can be truncated or have elements discarded to correspond to the desired length L, the auto-correlation and cross-correlation properties of the truncated code sequence can experience deterioration. Similarly, even if a code sequence portion is added/attached to the generated code sequence (e.g., zero-padding or cyclic prefix) to correspond to the desired length L, the auto-correlation and cross-correlation properties can experience deterioration. Here, auto-correlation properties relate to the auto-correlation value being 1 when the delay is 0. Otherwise, the auto-correlation value is 0 when the delay is a value other than 0. Further, the cross-correlation properties having a constant value is negatively affected.

Assuming that the code sequence having poor auto-correlation and cross-correlation properties are removed, the remaining number of code sequences may be less than L−1.

In order to attain a desired length and a maximum number of CAZAC sequence types corresponding to the desired length, a smallest prime number, X, greater than the desired length, L, (X>L) can be selected. Although the CAZAC sequence can be generated using X due to deterioration of the correlation properties, the correlations properties of CAZAC sequence as shown in Equations 4 and 5 cannot be attained. Further, when selecting a length of the generated code sequence, the length that is nearest to the desired length L which is between a smallest prime number larger than the desired length or a largest prime number smaller than the desired length can be selected.

Referring to FIG. 8, the generated CAZAC sequence has length X. Thereafter, the generated CAZAC sequence having length X has elements of the code sequence removed (or truncated) so as to make the length of the generated CAZAC sequence correspond to the desired length L.

Figure 9:
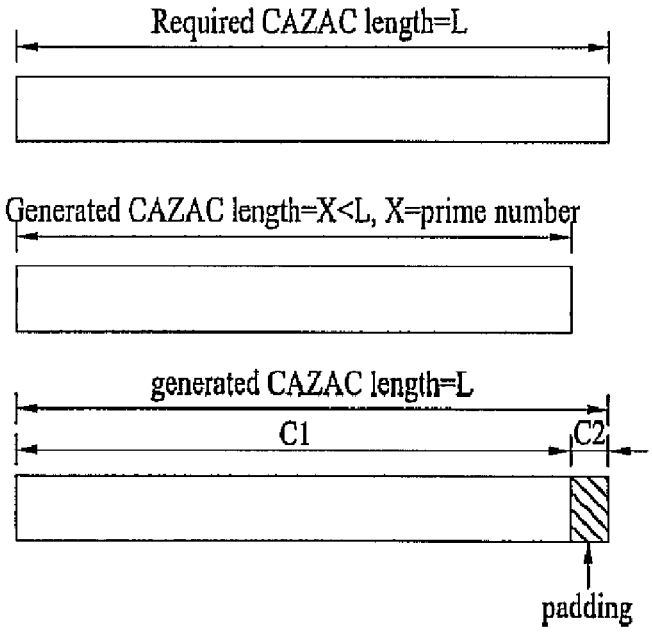
FIG. 9 illustrates a method of generating a CAZAC sequence using a padding portion.

FIG. 9 illustrates a method of generating a CAZAC sequence using a padding portion. As discussed, the generated CAZAC sequence is truncated. With respect to auto-correlation and cross correlation properties, delay of 0 indicates an auto-correlation value of 1, as shown in Equation 4, and a delay not equaling 0 indicates a value of 0. Moreover, the properties where the cross-correlation value is always a prime number is not deteriorated whereby effective correlation is maintained. Further, additional control information can be transmitted by using the information inputted to the fading unit.

Referring to FIG. 9, the generated CAZAC sequence has length X. Here, the value of X is a largest prime number less than the value of L. In other words, X is a prime number less than L. Thereafter, the generated CAZAC sequence having length X has elements added or a padding portion added to the CAZAC sequence in order to make the length of the generated CAZAC sequence correspond to the desired length L. Here, C1 represents the length of the CAZAC sequence having length X, and C2 represents the padding portion. By combining C1 and C2 (C1+C2), the generated CAZAC sequence can have a length corresponding to the desired length L.

Figure 10:
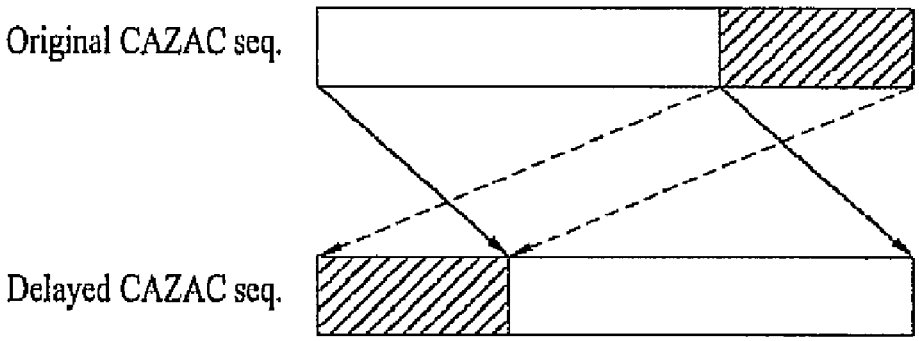
FIG. 10 illustrates an exemplary application of circular shift.

FIG. 10 illustrates an exemplary application of circular shift. The circular shift is typically applied to increase an amount of control information transmitted to the communication system. For example, a back portion of the sequence is re-allocated to a front portion of the sequence, and the remaining sequence is shifted in the direction of the back portion of the sequence in an amount (or length) corresponding to the re-allocated back portion, as illustrated in FIG. 10. Further, if specified control information is applied the circular shift as described above, the amount of control information that can be transmitted via a corresponding sequence increases.

Discussions of above relate to the methods of generating the sequence using the desired length L, and of increasing transmitted control information using the circular shift. If these methods are applied in generating the sequence, the following processes take place. First, select a smallest prime number greater than L or a largest prime number less than L, which is referred to as X. Second, remove or add a sequence unit having a length corresponding to X-L or L-X. Third, apply the circular shift to the resulting sequence.

Figure 11:
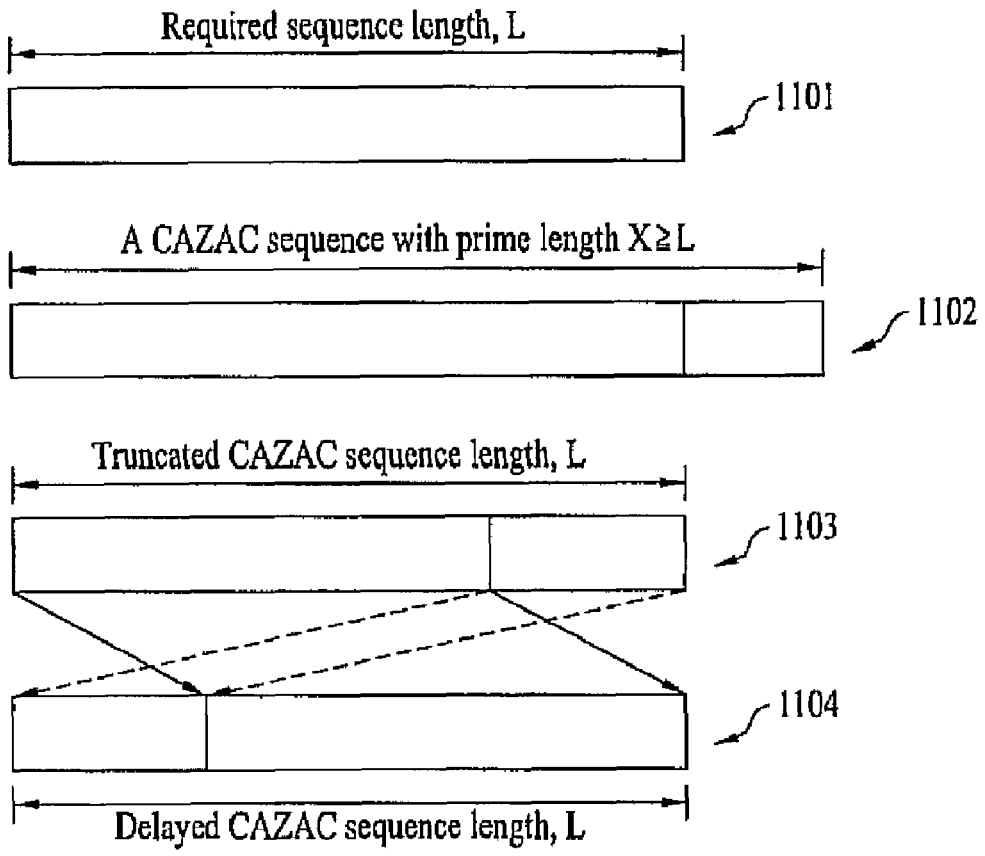
FIG. 11 is an exemplary diagram illustrating application of circular shift to the generated code sequence after the elements of the code sequence are removed.

FIG. 11 is an exemplary diagram illustrating application of circular shift to the generated code sequence after the elements of the code sequence are removed. Referring to FIG. 11, the code sequence 1102 is generated based on length X which is the smallest prime number greater than length L. In other words, the generated code sequence 1102 has a length equaling length X which is longer than the desired length L. From the generated code sequence 1102, a portion having a length corresponding to length X-L is removed, resulting in a code sequence having length L 1103. Thereafter, the result of the generated code sequence 1103 having length L is applied circular shift thereto, resulting in the code sequence 1104.

Figure 12:
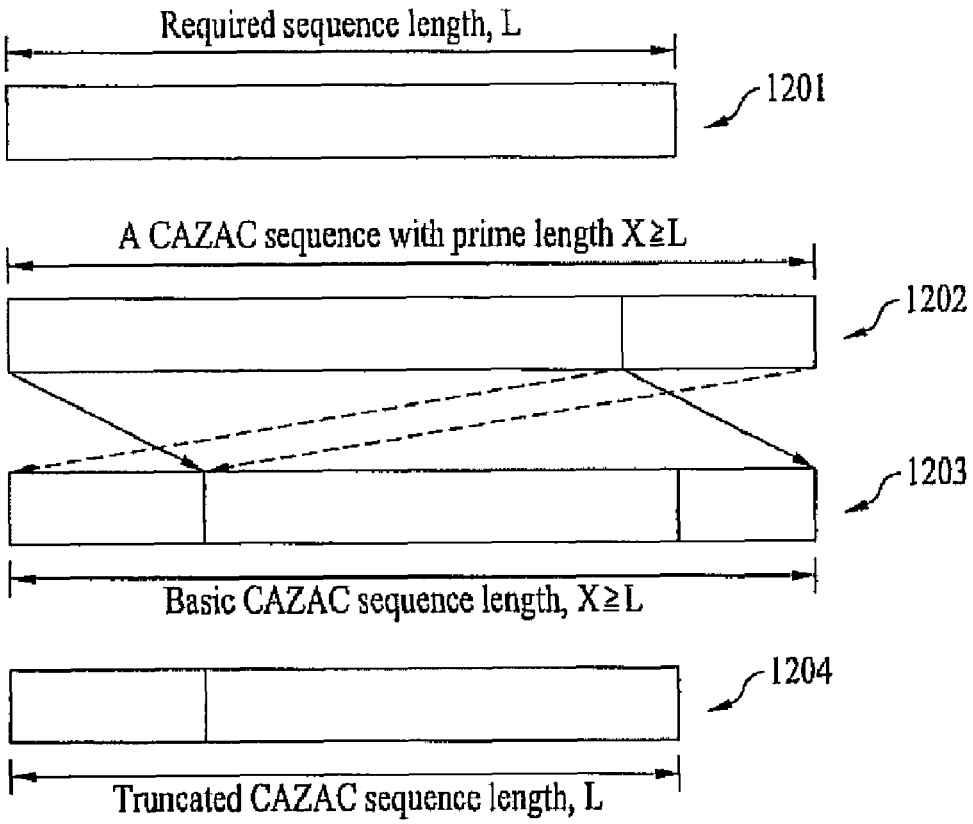
FIG. 12 is an exemplary diagram illustrating application of circular shift to the generated code sequence prior to removing the elements of the code sequence.

FIG. 12 is an exemplary diagram illustrating application of circular shift to the generated code sequence prior to removing the elements of the code sequence. In other words, circular shift is performed to the generated CAZAC sequence having length X and after circular shift is performed, the elements of the code sequence are removed.

Referring to FIG. 12, the code sequence 1202 is generated based on length X which is the smallest prime number greater than length L. In other words, the generated code sequence 1202 has a length equaling length X which is longer than the desired length L. A circular shift is then performed to the generated code sequence 1203 having length X. Thereafter, a portion of the generated code sequence having a length corresponding to length X-L is removed, resulting in a code sequence 1204 having length L.

Figure 13:
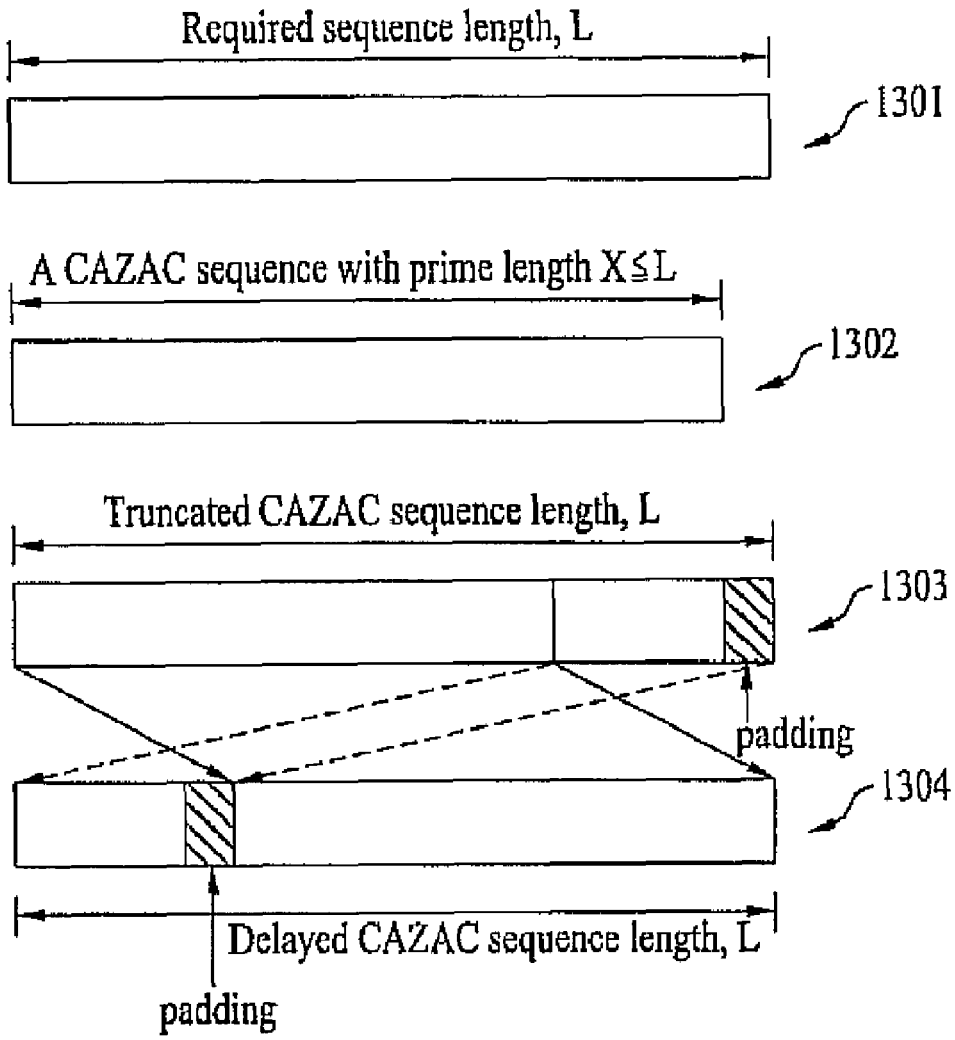
FIG. 13 is an exemplary diagram illustrating application of circular shift to the generated code sequence after a padding portion is attached.

FIG. 13 is an exemplary diagram illustrating application of circular shift to the generated code sequence after a padding portion is attached. Referring to FIG. 13, the code sequence 1302 is generated based on length X which is the largest prime number smaller than the value of length L. To the generated CAZAC sequence 1302, a padding portion is added 1303. The length of the padding portion corresponds to a length L-X. As discussed, the padding portion can be comprised of zeroes or cyclic prefix/postfix. With the addition of the padding portion, the length of the CAZAC sequence equals the desired length L. Thereafter, the result of the generated code sequence having length L 1303 is applied circular shift thereto, resulting in the CAZAC sequence 1304.

Figure 14:
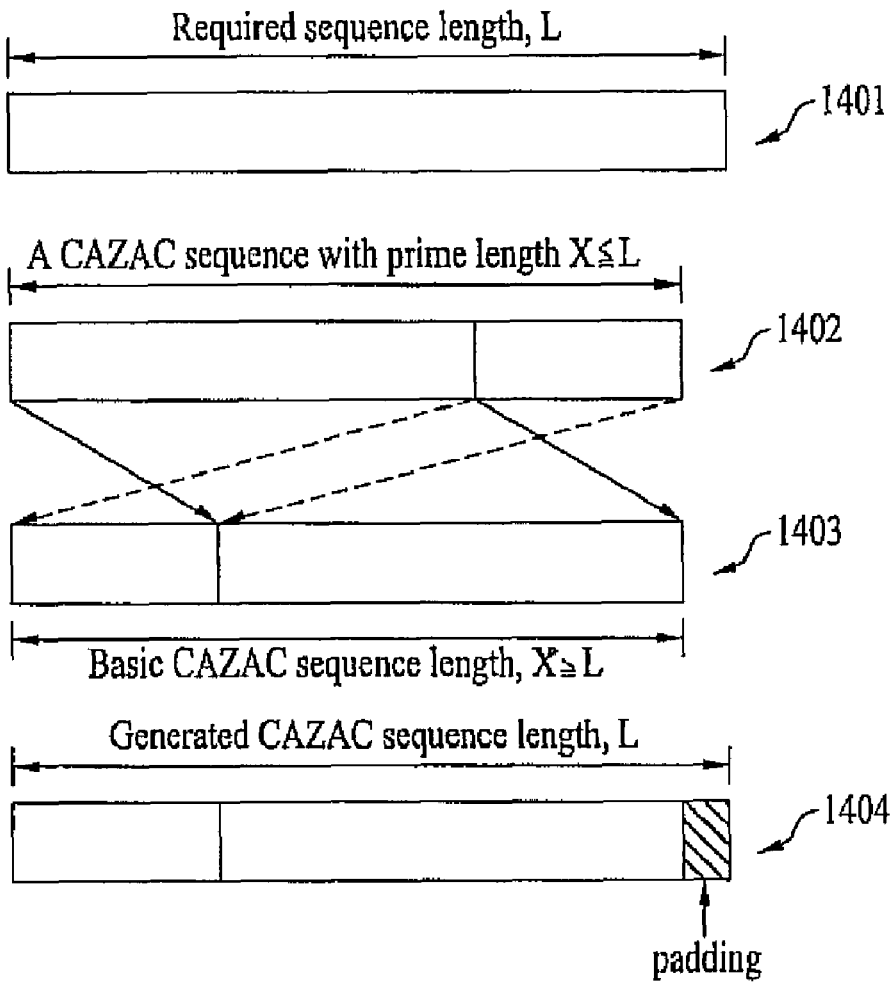
FIG. 14 is an exemplary diagram illustrating application of circular shift to the generated code sequence prior to attaching a padding portion.

FIG. 14 is an exemplary diagram illustrating application of circular shift to the generated code sequence prior to attaching a padding portion. In other words, circular shift is performed to the generated CAZAC sequence having length X, and after circular shift is performed, the padding portion is attached.

Referring to FIG. 14, the code sequence 1402 is generated based on length X which is the largest prime number smaller than the value of the desired length L. To the generated CAZAC sequence 1402, circular shift is performed. The circularly-shifted CAZAC sequence 1403 still has length X. To the CAZAC sequence 1403, a padding portion is added, resulting in the CAZAC sequence 1404. The length of the padding portion corresponds to a length L-X. As discussed, the padding portion can be comprised of zeroes or cyclic prefix/postfix. With the addition of the padding portion, the length of the CAZAC sequence 1404 equals the desired length L.

Between FIGS. 11 and 12, the difference is that circular shift is performed either before or after the elements of the CAZAC sequence are removed. By performing circular shift before removing the elements (or adjusting the length to equal the desired length), correlation deterioration can be reduced. To put differently, the CAZAC sequence does not have discontinuous codes.

Between FIGS. 13 and 14, the difference is that circular shift is performed either before or after the padding portion is added to the generated CAZAC sequence. By attaching the padding portion after performing circular shift, better correlation properties can be attained, especially since the padding portion is placed at the end of the code sequence.

Further, according to the discussion above, the desired length L (or required length) is first recognized. As illustrated with respect to FIGS. 11-14, the generated code sequence is adjusted/modified based on the desired length L. Based on that, after the desired length L recognized, a determination can be made as to whether the generated length X should be shortened or extended. In other words, the determination can be made whether to remove or discard at least one element of the generated code sequence or to add or insert at least one element to the generated code sequence. As discussed, the elements to be inserted can be a null (0) element (e.g., zero padding) or cyclic prefix/postfix, for example. In order to make the determination between discarding the element(s) or adding the element(s), the system can choose to select the length closest to the desired length L.

For example, if the desired length L is 75, the value of the smallest prime number greater than 75 is 79, and the value of the largest prime number smaller than the 75 is 73. Here, the prime number 73 can be selected since 73 is closer to 75 than 79 is to 75.

Although the illustration above selects the prime number closest to the desired length L, selection regarding removal or addition of the element(s) is not limited to the example of above and other implementations may be applied.

Regarding padding, there are five (5) schemes by which padding can be accomplished. As a first padding scheme, the padding portion can be comprised of a constant number (e.g., 0s). Although the padding portion is used to fill the portion of the code sequence so that the length of the code sequence coincides with the desired length, it is possible for the padding portion to be less then completely full. In other words, it is possible for that the length of the code sequence with padded portion is not equal to or is shorter than the code sequence with the desired length. That is, when the code sequence is used for functions deemed less important, such as for cell search or random access, it is not necessary to use the entire length of the code sequence, and as such, the padding portion does not need to be completely occupied to correspond to the desired length of the code sequence.

As a second padding scheme, the padding portion can be comprised of a repeated portion. In other words, the portion corresponding to L-X of the code sequence 1204 can be duplicated and inserted/attached to the end of the code sequence 1204. This can be referred to as cyclic postfix. Here, the code sequence uses the entire length L. When determining the identification (ID) of the code sequence, the entire length L is used to facilitate identifying of the code sequence ID. At the same time, the generated code sequence does not experience distortion by using the entire length L. In the discussion above, the cyclic postfix is used. Alternatively, cyclic prefix can also be used.

As a third padding scheme, the padding portion can be comprised of additional information through which different messages can be delivered. More specifically, the desired length L of the code sequence can be used to generate a supplemental code sequence whose length equals the desired length L (N=L). The code sequence portion corresponding to L-X is extracted from the supplemental code sequence and inserted/attached to the generated code sequence as the padded portion.

As a fourth padding scheme, a portion corresponding to length L-X is extracted from the code sequence and inserted as the padding portion. Here, the code sequence inserted to the padding portion may be a different code sequence than the code sequence 1204. Put differently, the code sequence inserted to the padding portion may be a CAZAC sequence having a length of M, for example, which is different from the code sequence 1204 having a length of L. Further, the code sequence inserted to the padding portion can be a different code sequence other than the CAZAC sequence. By using different code sequence, additional information can be delivered including information related to type of code sequence adjustments.

As a fifth padding scheme, the padding portion can be used as lower bandwidth guard interval. During transmission of control information using a prescribed sequence, the following possible scenarios can occur such as transmitting data without establishing synchronization with an access channel, transmitting data by a plurality of users within a communication system, and distortion of frequency of the received data.

Furthermore, the padding portions can be placed at both ends of the code sequence to use the padding portions as guard intervals of the lower bandwidth. Consequently, a more reliable acquisition of control information from the received data can take place despite distorted frequency signals. In the padding portions used as guard intervals, constant numbers (e.g., 0s) can be used or cyclic prefix or postfix of the generated code sequence can be used.

If the padding portions are placed at both ends of the code sequence and used as guard intervals of the lower bandwidth, the code sequences can be protected from frequency signal distortions. Moreover, if 0s are inserted between the guard intervals or put differently, within the code sequence, interference to neighboring codes can be reduced. Alternatively, if cyclic prefix/postfix is used as guard intervals, the code sequences can be protected from frequency distortions and can be used to transmit the control information containing the sequence ID if there is no frequency distortion.

Figure 15:
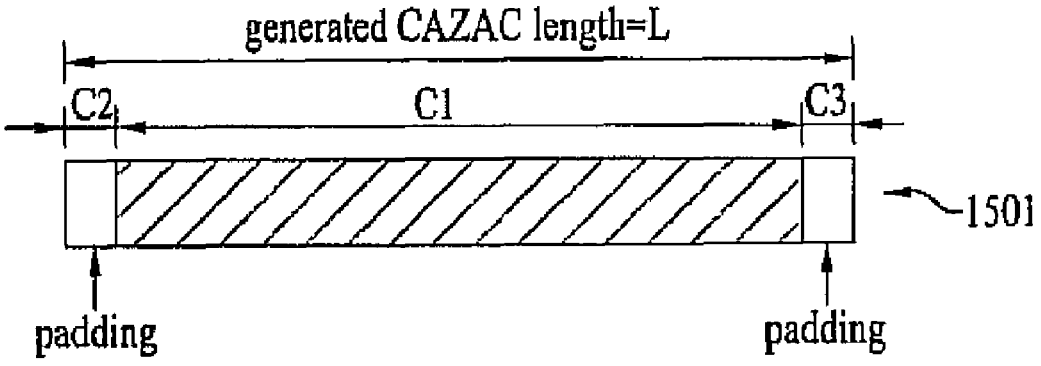
FIG. 15 is an exemplary diagram of a padding portion of the code sequence in which the padding portion is used as a lower bandwidth guard interval.

FIG. 15 is an exemplary diagram of a padding portion of the code sequence in which the padding portion is used as a lower bandwidth guard interval. Referring to FIG. 15, the code sequence 1501 can be divided into three (3) parts—a portion (C1), which is generated based on length X, and the other two portions (C2 and C3) are attached to both ends of the code sequence 1501.

In the discussions above, five (5) padding schemes are introduced. However, the padding schemes are not limited to the discussed schemes, and there can be other types of padding schemes.

Besides the first padding scheme in which no information is inserted, the other four padding schemes insert additional information in the padding portions to allow expansion of the code sequence and/or transmission of message(s). Various information can be inserted into the padding portion including, for example, initial access information, timing update information, resource request information, user ID information, channel quality information (CQI), user group ID information related to a random access channel (RACH). Furthermore, the information can include cell ID information, multi-input multi-output (MIMO) information, and synchronization channel information of a synchronization channel (SCH), for example. In addition, the padding portion can be used for transmitting data for message transmission as well as arbitrary information using a code sequence having a length of L-X.

Figure 16:
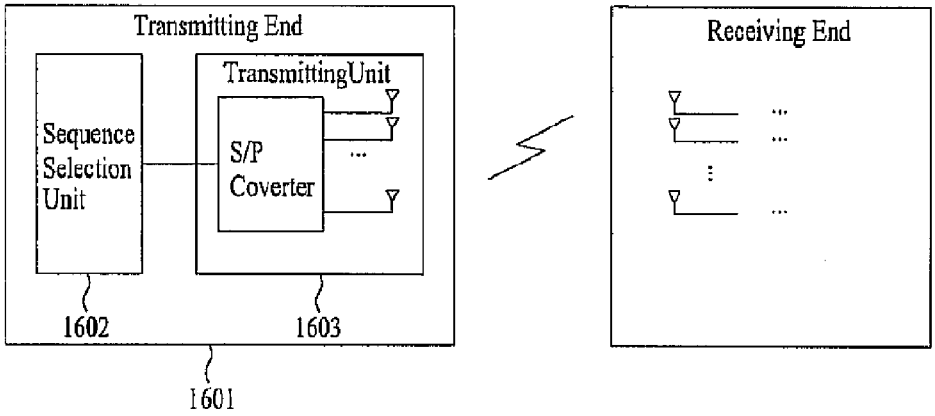
FIG. 16 is a structural diagram for transmitting the code sequence. Depending on whether the transmission of the code sequence is made in a downlink direction or an uplink direction, the structure can be in different form.

FIG. 16 is a structural diagram for transmitting the code sequence. Depending on whether the transmission of the code sequence is made in a downlink direction or an uplink direction, the structure can be in different form. With that, FIG. 16 is described with respect to a general transmitting end for transmitting the control signal.

Referring to FIG. 16, the transmitting end 1601 comprises a sequence selection unit 1602 and a transmitting unit 1603. The sequence selection unit 1602 is used to generate the code sequence for transmitting the control information. More specifically, the sequence selection unit 1602 performs an operation to select a code sequence having a desired length of L. In other words, the sequence selection unit 1602 stores the value of the desired length L, and then selects an appropriate code sequence for expressing the control information to be transmitted where the code sequence has a length of L.

The code sequence that can be selected by the sequence selection unit 1602 has a length of L as illustrated in FIGS. 12 and 14 (e.g., code sequence 1204 and code sequence 1404). Moreover, the code sequence is applied circular shift (e.g., code sequences 1203 and 1403) to which a padded portion corresponding to lengths L-X or X-L is removed or inserted/added. As a result, discontinuous parts are not formed within or in the code sequence to promote superior correlation characteristics.

Although it is preferable to use length X which is a smallest prime number greater than the length of L or a largest prime number smaller than the length of L, as long as the value of length X is a prime number, different or other prime numbers can be used as the value of length X.

Figure 17:
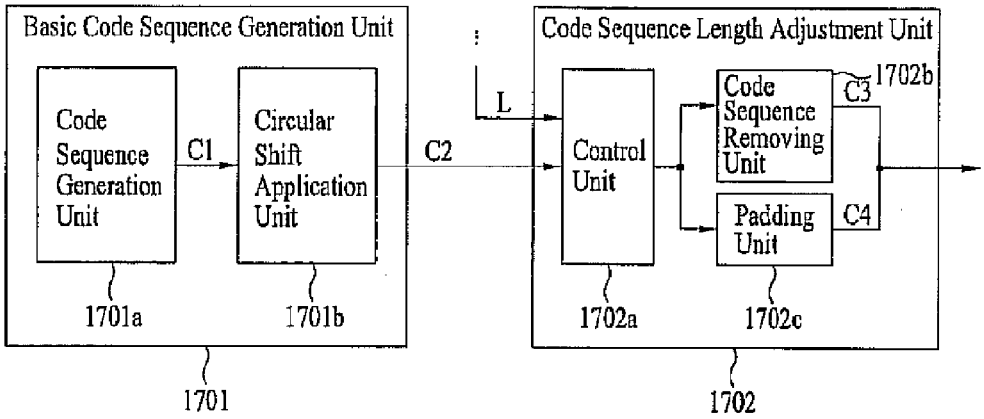
FIG. 17 is a structural diagram illustrating a basic code sequence generation unit and a code sequence length adjustment unit.

FIG. 17 is a structural diagram illustrating a basic code sequence generation unit and a code sequence length adjustment unit. In FIG. 17, the basic code sequence generation unit 1701 further comprises a code sequence generation unit 1701a and a circular shift application unit 1701b. The code sequence generation unit 1701a is used to generate a first code sequence (C1). Here, C1 can be defined as a code sequence having a length of X where the value of length X is a smaller prime number larger than the value of length L or a code sequence having a length of X where the value of length X is a larger prime number smaller than the value of length L. C1 is then applied circular shift by the circular shift application unit 1701b. More specifically, the circular shift application unit 1701b receives C1 having length of X applies circular shift, and outputs a second code sequence (C2) to the code sequence length adjustment unit 1702.

The code sequence length adjustment unit 1702 further comprises a control unit 1702a, a code sequence removing unit 1702b, and a padding unit 1702c. More specifically, the control unit 1702a receives C2 as well as the value of length L. The control unit 1702a determines whether to remove a portion/section of C2 or insert/add a portion/section to C2. Based on the determination from the control unit 1702a, C2 is delivered to the sequence removing unit 1702b in which a portion/section of C2 corresponding to a length of X-L is removed. Alternatively, C2 can be delivered to the padding unit 1702c for inserting/adding a portion/section of C2 whose length corresponds to the length of L-X.

If C2 and the value of length L are provided to the control unit 1702a, the control unit 1702a compares the value of length X which identifies the length of C2 with the value of the length L. Here, if X is greater than L, then C2 is inputted into the sequence removing unit 1702b. From C2, the portion length of C2 corresponding to length X-L is removed, resulting in C3. However, if X is less than L, then C2 is inputted into the padding unit 1702c. From C2, the padding portion length corresponding to length L-X is inserted/added to C2, resulting in C4. Here, the padding portion can be inserted to either end or both ends of C2.

Figure 18:
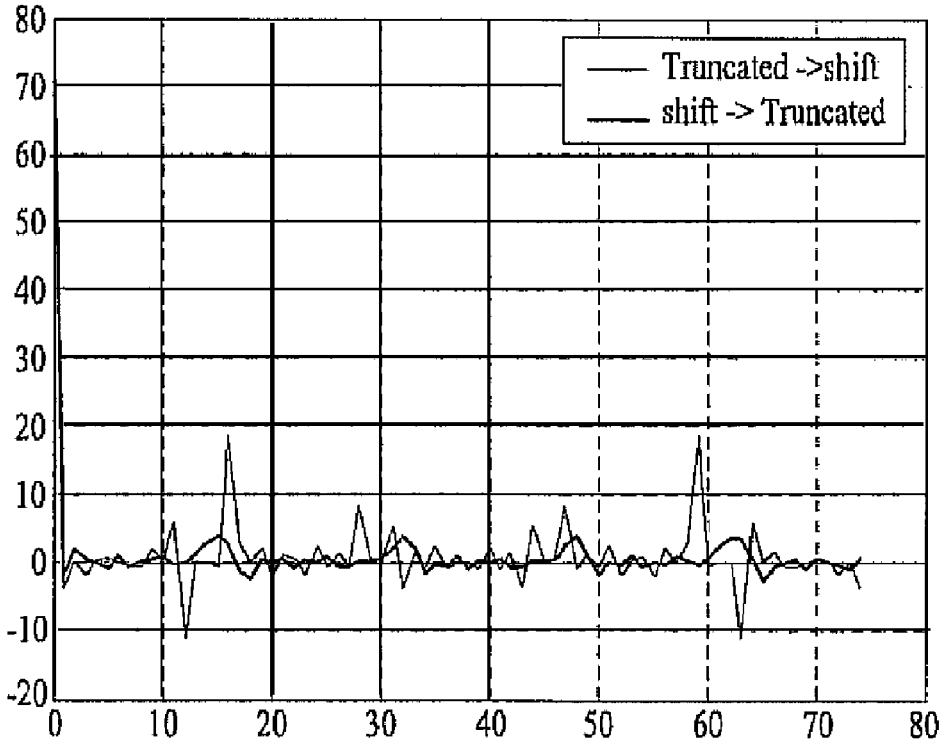
FIG. 18 illustrates cross-correlation characteristics of the code sequence.
Figure 19:
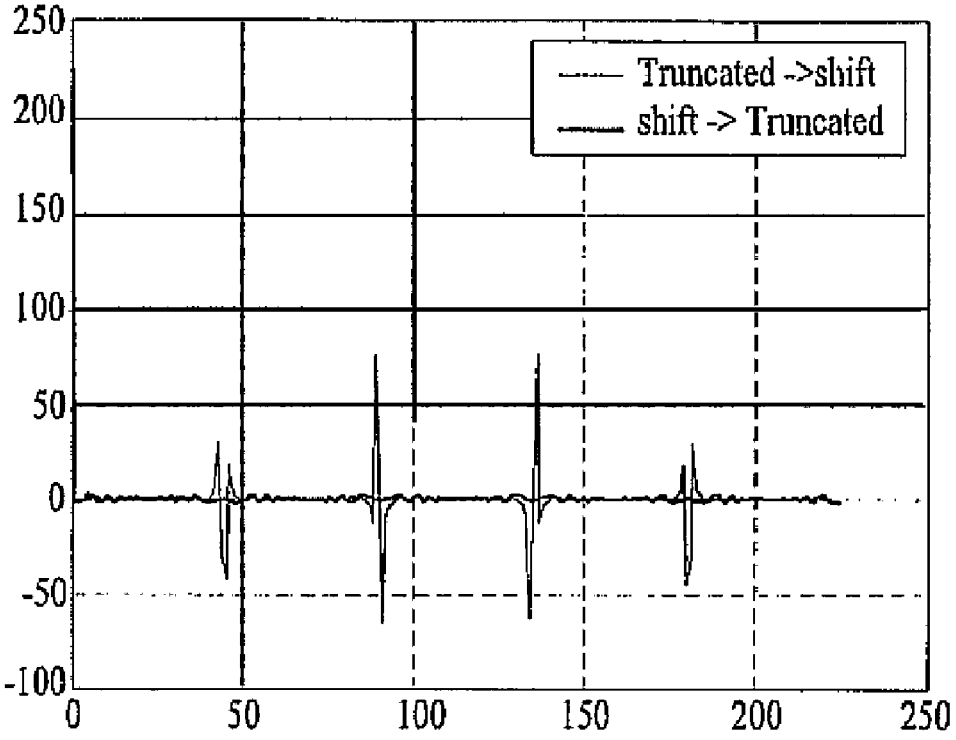
FIG. 19 illustrates cross-correlation characteristics of the code sequence.

FIGS. 18 and 19 illustrate cross-correlation characteristics of the code sequence. The illustrations of FIGS. 18 and 19 is based on the value of length X being the smallest prime number greater than the value of the desired length L; however, the illustrations are not limited to the smallest prime number greater than length L but can have a prime number value of length X smaller than the value of length L.

Referring to FIGS. 18 and 19, the x-axis represents values of circular shift while the y-axis represents un-normalized cross-correlation values. Furthermore, a thinner line represents the value of cross-correlation of the code sequence with circular shift applied thereto after a code sequence portion having the length X-L is removed. A darker/thicker line represents values of code sequence to which circular shift is applied prior to removing the code sequence portion corresponding to the length X-L. More specifically, FIG. 7 illustrates a graph where L is 75 and X is 79 which is the smallest prime number greater than 75. Moreover, FIG. 8 illustrates a graph where L 8 is 225 and X is 227 which is the smallest prime number greater than 225.

In FIGS. 18 and 19, if the value of circular shift is 0 or put differently, if there is no shift, then high correlation value is indicated only when the auto-correlation value of the code sequence corresponds and in other cases, moderate correlation is maintained. On the contrary, if the code sequence has a section corresponding to length X-L is removed and thereafter applied circular shift, severe fluctuations occur with correlation values, resulting in deteriorated correlation characteristics. As such, if cross-correlation is used to analyze the code sequence, the code sequence according to the embodiments of the present invention shows superior performance and outcome to that of the conventional code sequence.

Figure 20:
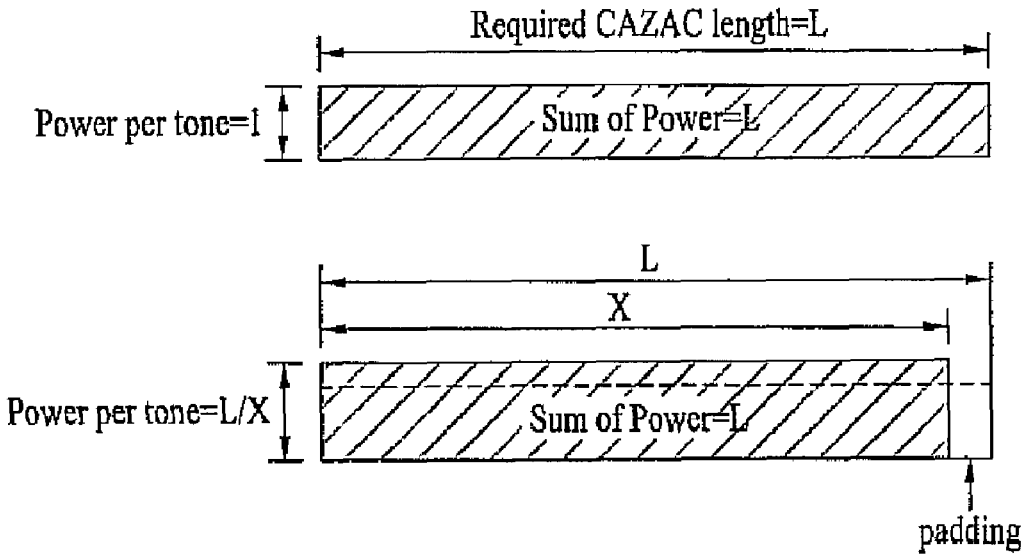
FIG. 20 is an exemplary diagram illustrating boosting the power of the generated code sequence.

FIG. 20 is an exemplary diagram illustrating boosting the power of the generated code sequence. As discussed, the code sequence is generated based on length X, and a padding portion, whose length corresponds to length L-X is attached to the code sequence (e.g., CAZAC sequence). Thereafter, the portion of the code sequence corresponding to length X is used where length L is divided by length X (L/X). The result of the division is the amount of power that can be boosted. Moreover, the amount of power that can be boosted can be applied to the code sequence whose length is length X. When the receiving end receives power boosted code sequence, more effective detection performance can be achieved since interference is reduced.

However, regarding a code sequence generated with a padding portion with cyclic prefix/postfix attached thereto, there is no need to power boost since all of the code sequences corresponding to length L are used for acquiring sequence ID information.

In the receiving end, information related to the generated code sequence and length X used to generate the code sequence is received. From the code sequence, a portion corresponding to length X is processed to acquire the control information. To this end, it is important to first receive synchronization information of the received data. Equation 7 and Equation 8 can be used to acquire synchronization information. Here, Equation 7 relates to auto-correlation, and Equation 8 relates to cross-correlation.

$$R_{M:N}(d) = \sum_{k=0}^{X-1} c(k, M, X) \cdot c^*(\mathrm{mod}(k+d), X); M, X) \quad \text{[Equation 7]}$$

$$R_{M_1:M_2:N}(d) = \sum_{k=0}^{X-1} c(k, M_1, X) \cdot c^*(\mathrm{mod}(k+d), X); M_2, X) \quad \text{[Equation 8]}$$

Equation 7 is used to acquire auto-correlation value(s) from the received code sequence whose sequence ID is M. Further, the acquired auto-correlation value d, which is a value other than 0, is used to achieve synchronization.

Equation 8 is used to acquire cross-correlation value(s) of a code sequence whose ID is $M_2$ from the received code sequence whose sequence ID is $M_1$. Through the acquired value, synchronization can be achieved.

Typically, if the wireless communication system is a synchronous network, auto-correlation is used to acquire synchronization information, and if the system is an asynchronous network, cross-correlation is used to acquire synchronization information. However, according to the embodiments of the present invention, synchronization information can be acquired using any one or at least one of the correlation schemes.

After the synchronization information of the received code sequence is acquired, the receiving end analyzes the received code sequence to acquire the sequence ID, as shown in Equations 9 and 10.

$$\sigma c(k; M, X) = c(k+1; M, X) \cdot c^*(k; M, X) \quad \text{[Equation 9]}$$

$$(\text{for } k = 0, 1, \ldots, L-1)$$

$$\sigma c(k; M, X) = c(k+1; M, X) \cdot c^*(k; M, X) \quad \text{[Equation 10]}$$

$$(\text{for } k = 0, 1, \ldots, X-1)$$

In Equations 9 and 10, σc(k; M,X) denotes difference sequence of the received sequences. Equation 9 is used to acquire the ID information of the received sequence using the differential sequence corresponding to the total length of the received sequence. Equation 9 can also be used to acquire the ID information of the code sequence which has been generated with the cyclic prefix/postfix padded portion. Equation 10 is used to acquire the ID information of the received sequence using the smallest prime number corresponding to length X.

As discussed, if the differential sequence of the CAZAC sequence is calculated using Equations 9 or 10, k of the sequence index is generated, and the result therefrom is transformed by the Fourier transform scheme, to show a single peak value. Thereafter, by detecting the peak value, the ID information of the sequence can be acquired.

The discussion of above regarding a code sequence or a code sequence set can be applied to 3$^{rd}$ Generation Partnership Project (3GPP) system or 3GPP2 system as well as a Wibro system or a Wimax system.—

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting a synchronization channel (SCH) signal by generating a code sequence in a wireless communication system, the method comprising:

generating a first code sequence ($C_1$) having a first length by using a first variable ($M_1$);

generating a second code sequence ($C_2$) having a second length by using a second variable ($M_2$), wherein the $M_1$ and the $M_2$ are different from each other;

generating the code sequence as a combination of the first code sequence ($C_1$) and the second code sequence ($C_2$); and transmitting the code sequence as the SCH signal, wherein at least one of the first length and the second length is a prime number length, and [the] *a* sum of the first length and the second length corresponds to a length of the SCH signal, wherein the combination of the first code sequence ($C_1$) and the second code sequence ($C_2$), each of which is generated using the different variables, provides a receiving end device with information about a cell identification and a location of the SCH *signal* within a radio frame.

2. An apparatus for transmitting a synchronization channel (SCH) signal by generating a code sequence in a wireless communication system, the apparatus comprising:

a code sequence generating module for generating a first code sequence ($C_1$) having a first length by using a first variable ($M_1$), generating a second code sequence ($C_2$) having a second length by using a second variable ($M_2$), wherein the $M_1$ and the $M_2$ are different from each other, and generating the code sequence as a combination of the first code sequence ($C_1$) and the second code sequence ($C_2$); and a transmission module for transmitting the code sequence as the SCH signal, wherein at least one of the first length and the second length is a prime number length, and [the] *a* sum of the first length and the second length corresponds to a length of the SCH signal, wherein the combination of the first code sequence ($C_1$) and the second code sequence ($C_2$), each of which is generated using the different variables, provides a receiving end device with information about a cell identification and a location of the SCH *signal* within a radio frame.

3. A method for receiving a synchronization channel (SCH) signal by using a code sequence in a wireless communication system, the method comprising:

receiving the code sequence as the SCH signal in a form of a combination of a first code sequence ($C_1$) having a first length, which has been generated by using a first variable ($M_1$), and a second code sequence ($C_2$) having a second length, which has been generated by using a second variable ($M_2$), wherein the $M_1$ and the $M_2$ are different from each other; and acquiring information about a cell identification and a location of the SCH within a radio frame via the combination of the first code sequence ($C_1$) and the second code sequence ($C_2$), wherein at least one of the first length and the second length is a prime number length, and [the] *a* sum of the first length and the second length corresponds to a length of the SCH signal.

* * * * *

UNITED STATES PATENT AND TRADEMARK OFFICE

CERTIFICATE OF CORRECTION

PATENT NO. : RE45,522 E
APPLICATION NO. : 14/051074
DATED : May 19, 2015
INVENTOR(S) : Han et al.

It is certified that error appears in the above-identified patent and that said Letters Patent is hereby corrected as shown below:

Column 1, line 11, above the heading, "CROSS-REFERENCE TO RELATED APPLICATIONS" insert -- Notice: More than one reissue application has been filed for the reissue of patent 8,036,256. The reissue applications are U.S. application Nos. 14/676,015, filed on 04/01/2015, which is a continuation reissue application of a reissue application No. 14/051,074 (the present application), filed on 10/10/2013, now U.S. Patent No. RE44,522 E.--.

Signed and Sealed this
Twenty-second Day of March, 2016

Michelle K. Lee

Michelle K. Lee
*Director of the United States Patent and Trademark Office*